T. P. ROBSON.
SHOVEL.
APPLICATION FILED JUNE 5, 1916.
1,201,505.
Patented Oct. 17, 1916.
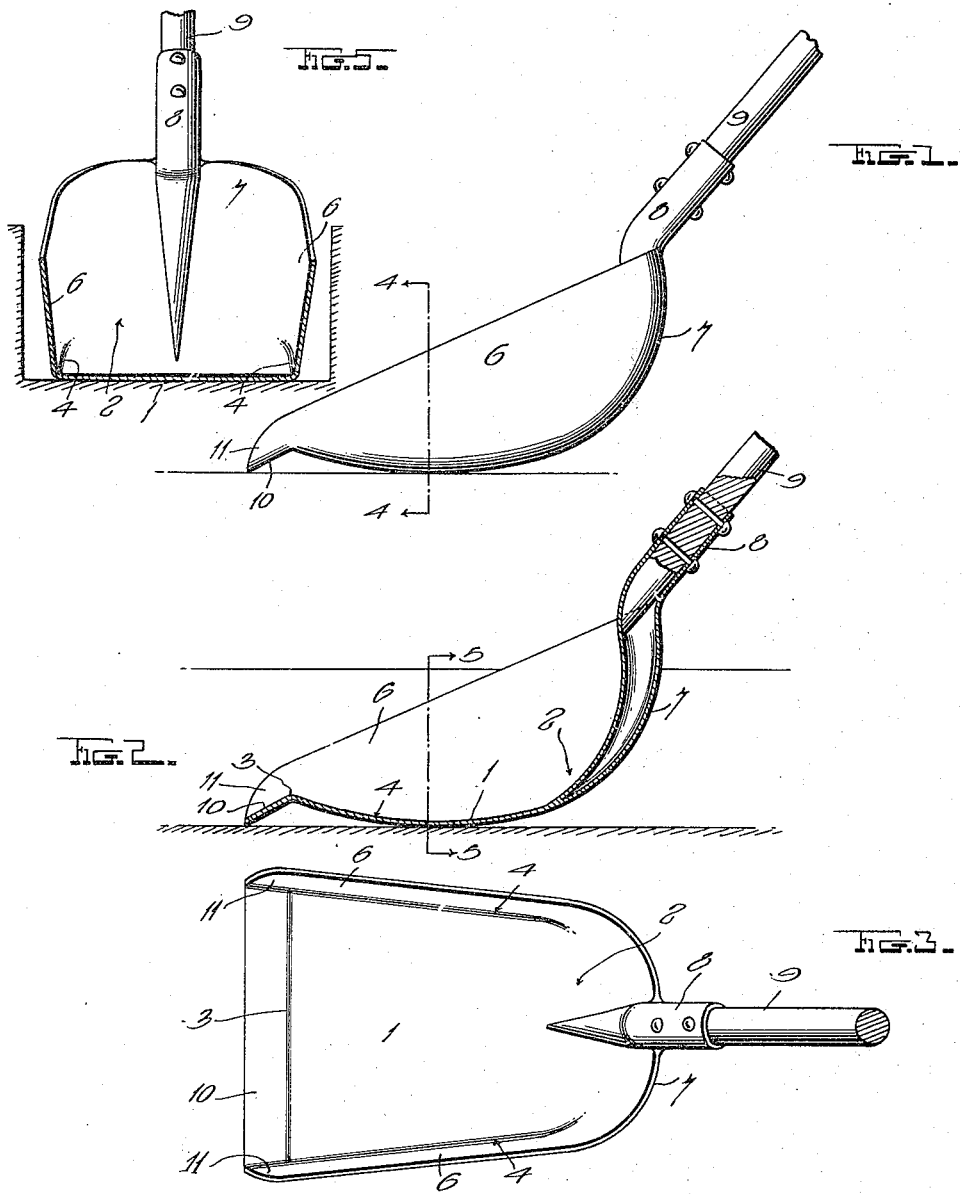

UNITED STATES PATENT OFFICE.

THOMAS PUTMAN ROBSON, OF ELYRIA, OHIO.

SHOVEL.

1,201,505. Specification of Letters Patent. Patented Oct. 17, 1916.

Application filed June 5, 1916. Serial No. 101,796.

*To all whom it may concern:*

Be it known that I, THOMAS PUTMAN ROBSON, a citizen of the United States, residing at Elyria, in the county of Lorain and State of Ohio, have invented certain new and useful Improvements in Shovels; and I do declare the following to be a full, clear, and exact description of the invention, such as will enable others skilled in the art to which it appertains to make and use the same.

This invention relates to new and useful improvements in shovels, and the primary object of the invention is to provide a shovel which is especially adapted for use in removing the contents from a gutter that extends behind the stalls in a stable, and the shovel is so constructed that it may easily gather and lift the contents of the gutter to a movable carrier so that the gutter may be cleaned in a thorough and efficient manner.

A further object of the invention is to provide a device of this character which is simple and durable in construction, inexpensive to manufacture and one which will be very efficient in operation.

With these and other objects in view, the invention consists of the novel features of construction, and the combination and arrangement of parts which will be herein referred to and more particularly pointed out in the specification and claims.

In the accompanying drawings: Figure 1 is a side elevation of my improved shovel; Fig. 2 is a central vertical longitudinal section of the same; Fig. 3 is a top plan view; Fig. 4 is a transverse section taken on the line 4—4 of Fig. 1; Fig. 5 is a transverse section taken on the line 5—5 of Fig. 2.

In describing my invention I shall refer to the drawings in which similar reference characters designate corresponding parts throughout the several views and in which—

The numeral 1 designates the bottom portion of my new and improved shovel which is substantially arcuate shaped throughout its longitudinal extent and has formed adjacent its rear end a deep pocket 2. This bottom is formed with a front straight edge 3 and inwardly sloping side edges 4 which terminate in the outwardly curved rear end of the bottom.

The side edges 4 of the bottom 1 are provided with upwardly and outwardly extending integral extensions which form side walls 6 for the shovel, and the side walls 6 are connected with the rear end of the bottom that forms a rear wall 7 for the same. These side walls and rear wall of the shovel are formed integrally with the bottom and the same extend upwardly therefrom with their upper edges disposed in a single plane.

Secured to the upper surface of the rear end of the bottom 1, and to the inner surface of the rear wall 7 is an integral handle securing socket 8 which projects upwardly and outwardly from said shovel and has a handle 9 secured in its outer end. This construction and the manner of applying the same is clearly illustrated in Figs. 2 and 3 of the drawing. If desired, however, the handle securing socket instead of being formed integrally with the shovel, may form a separate piece therefrom, and be secured into engagement therewith in any desired manner.

Projecting forwardly and inclined downwardly from the straight front edge 3 of the bottom 1 of the shovel is a lip 10 which is substantially the same width as the width of said bottom, and is provided at its opposite side edges with upwardly projecting outwardly sloping integral sides 11. The upper edges of these sides 11 are curved rearwardly and are connected with the forward extremities of the sides 6 of the shovel. The sides 11 are formed integrally with the lip 10 and the sides 6, and owing to the fact that all of the different parts of this shovel are formed from a single piece of material, preferably metal, the same may be stamped out, thus affording a great saving in time and labor when constructing the shovel.

This type of shovel is especially adapted to be used in removing the contents of gutters that run along behind the stalls in stables, and the new and improved construction of the shovel enables the contents to be easily removed from the gutters and to be placed in the movable carrier in a very quick and efficient manner, and at the same time thoroughly cleansing the gutter. This shovel may be used for various other purposes, and owing to the deep pocket formed therein, it will be found especially adapted for use in lifting various loose materials, for instance, where the material to be lifted is in a partly liquid state.

When the shovel is positioned in the gutter as clearly shown in Figs. 2 and 5 of the drawing, it will be obvious that when the same is moved therealong, all of the contents of the gutter that are disposed in front of the shovel will be gathered into the body of the same by its forward movement, and the deep pocket 2 adjacent the rear end will enable this shovel to hold a considerable quantity. The inclined lip forms a guide and also tends to increase the depth of the pocket. When a sufficient quantity of material has been gathered, the shovel may be lifted from the gutter and its contents are dumped in any type of movable carrier. The rear end of the shovel when in position is slightly higher than the sides of the gutter and extends above the same as clearly shown in Fig. 2 of the drawing.

From the foregoing description, the construction and operation of my invention will be readily understood and it will be seen that I have provided a simple and efficient device of this character carrying out the objects of the invention. This type of shovel will absolutely and thoroughly cleanse the gutter in a simple and efficient manner and will require very little labor to operate the same. Owing to the deep pocket contained therein, its capacity is increased and the contents will be readily held without any likelihood of dropping therefrom upon movement of the carrier.

I claim:

A shovel comprising an arcuate shaped longitudinally extending bottom having a straight front edge and inwardly curved side edges terminating in an outwardly curved rear edge said bottom forming a deep pocket adjacent its rear end, outwardly and upwardly extending integral side walls and a rear wall for said shovel, the side wall projecting from the corresponding side edges and the rear wall forming part of the bottom and both terminating in a single plane, handle securing means on the upper surface of the rear end of said bottom, a forwardly and downwardly inclined lip projecting from the straight front edge of said bottom, and outwardly sloping upwardly projecting integral sides on said lip having curved upper edges extending rearwardly and merging with the forward extremities of the sides of said shovel.

In testimony whereof I have hereunto set my hand in the presence of two subscribing witnesses.

THOMAS PUTMAN ROBSON.

Witnesses:
G. R. WALSH,
IRMA AUSTIN.

Copies of this patent may be obtained for five cents each, by addressing the "Commissioner of Patents, Washington, D. C."